United States Patent [19]

Lanasa

[11] Patent Number: 5,587,521

[45] Date of Patent: *Dec. 24, 1996

[54] PIPE TESTING SYSTEM

[76] Inventor: Douglas Lanasa, P.O. Box 753, Channelview, Tex. 77530

[ * ] Notice: The term of this patent shall not extend beyond the expiration date of Pat. No. 5,481,902.

[21] Appl. No.: 523,450

[22] Filed: Sep. 5, 1995

Related U.S. Application Data

[63] Continuation of Ser. No. 188,023, Jan. 28, 1994, Pat. No. 5,481,902.

[51] Int. Cl.⁶ ........................................... G01M 3/28
[52] U.S. Cl. ................. 73/49.1; 73/49.5; 73/49.6
[58] Field of Search ...................... 73/49.1, 49.5, 73/49.6, 49.8

[56] References Cited

U.S. PATENT DOCUMENTS

| | | | |
|---|---|---|---|
| 1,973,674 | 9/1934 | Rosenkranz | 73/49.6 |
| 4,470,295 | 9/1984 | Pounds et al. | 73/49.5 |
| 4,858,464 | 8/1989 | Miller et al. | 73/49.5 |

*Primary Examiner*—Michael Brock
*Attorney, Agent, or Firm*—Keaty & Keaty

[57] ABSTRACT

This invention relates to a mobile pipe testing system. The system carries its own supply of a test fluid and an independent power source. During operation, a pipe is lifted by an inbound conveyor and is delivered to a pre-test station, from which it is lifted by the arm and deposited into a testing cradle. The ends of the pipe are sealed by test plugs which are moved into engagement with the pipe ends, and a pressure is applied to the interior of the pipe to test the pipe for possible leakage. Once the test is complete, the test plugs are moved away from engagement with the pipe, and the lifting arm moves the pipe segment into a holding station, wherein the pipe is allowed to drain, while the fluid is filtered, collected and recycled back into a fluid container. The lifting arm then transports the pipe to the outbound conveyor which off loads the pipe.

9 Claims, 2 Drawing Sheets

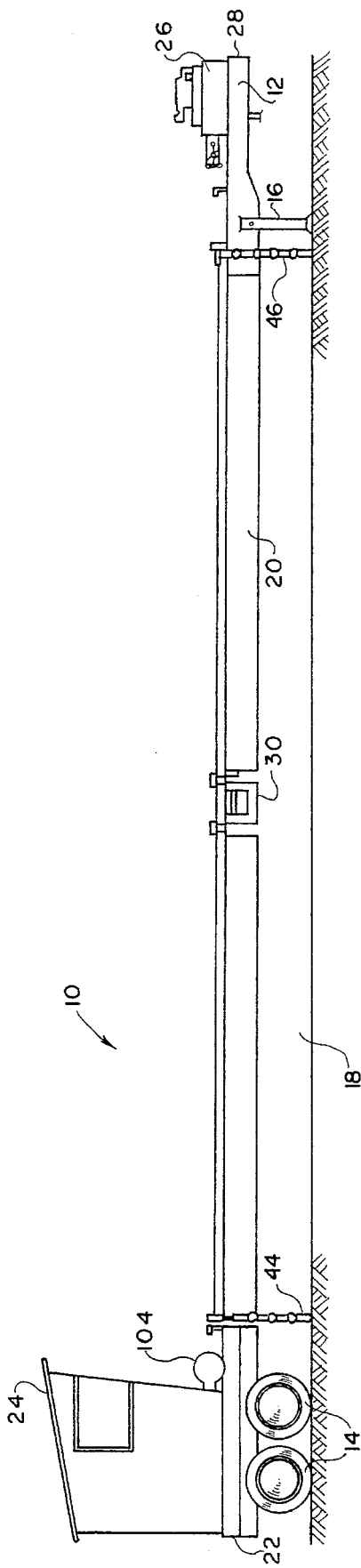

5,587,521

PIPE TESTING SYSTEM

CROSS REFERENCE TO RELATED APPLICATIONS

This is a continuation application of my co-pending application Ser. No. 08/188,023 filed on Jan. 28, 1994 for "A Pipe Testing System", now U.S. Pat. No. 5,481,902, a full disclosure of which is incorporated by reference herein.

BACKGROUND OF THE INVENTION

This invention relates to pipe testing equipment, and more particularly to a system for testing pipe segments in situ.

In many field operations it is most important to determine structural integrity of the pipe wall and find pipe segments which have cracks or holes, so as to prevent this particular pipe segment to be incorporated into a pipeline. The cracks that might occur in structurally weak pipes will result in a loss of pressure in the pipe line, will adversely effect the cost of operation and can even lead to escape of hazardous materials. It is also important to test the pipe segment in an efficient and cost productive manner spending as little time for the operation as possible. It is desirable from the point of view of a contractor to have the pipe segment tested in the field, without having to transport the segment for testing to a stationary laboratory at a location often remote from the work site. The present invention contemplates elimination of drawbacks associated with prior art and provide a mobile system for testing the pipe segments in the field.

SUMMARY OF THE INVENTION

It is, therefore, an object of the present invention to provide a mobile unit specifically adapted to conduct pipe testing in situ.

It is another object of the present invention to provide for pipe testing systems which can handle-pipes in a safe and efficient manner.

It is a further object of the present invention to provide a pipe testing system which is self contained as a unit.

It is still a further object of the present invention to provide a pipe testing system which can recycle the testing fluid with minimum waste.

This and other objects of the present invention are achieved through a provision of a pipe testing system which comprises a mobile platform adapted to be transported to a remote location by conventional tractor/trailer. The platform carries a fluid reservoir filled with a testing fluid and its own independent power source. The platform is divided into a pre-test station, a testing cradle and a holding station, each adapted to receive the pipe during a testing cycle.

A pair of hydraulically operated rams are mounted on opposite ends of the platform, each ram carrying an end plate to which a test plug is securely attached. The test plugs are in fluid communication with the fluid container and receive the tests fluid for delivering it into the interior of the pipe. A pressure relief valve is provided for releasing air from the pipe before the pressure is applied to the interior of the pipe.

A hydraulically operated arm moves the pipe from the pretest station to the testing cradle, then to the holding station and to an outbound conveyor. The lifting arm is also hydraulically operated from a control station of the unit. A plurality of locking arms extend above the testing cradle to prevent movement of the pipe from the cradle. Once the pipe is filled with the testing fluid, a pressure is applied to the interior of the pipe for detecting any possible leakage in the pipe segment. The pressure is monitored by an operator from the control unit. After the test is complete, the pressure is released through a relief valve, the test plugs are removed from the ends of the pipe allowing the pipe to be picked up by the lift arms and rolled to the holding station and then to an outbound conveyor.

BRIEF DESCRIPTION OF THE DRAWINGS

Reference will now be made to the drawings, wherein like parts are designated by like numerals, and wherein FIG. 1 is schematic side view of the system in accordance with the present invention.

FIG. 2 is a top schematic view of the loading/unloading platform.

DETAIL DESCRIPTION OF THE PREFERRED EMBODIMENT

Figure 3:
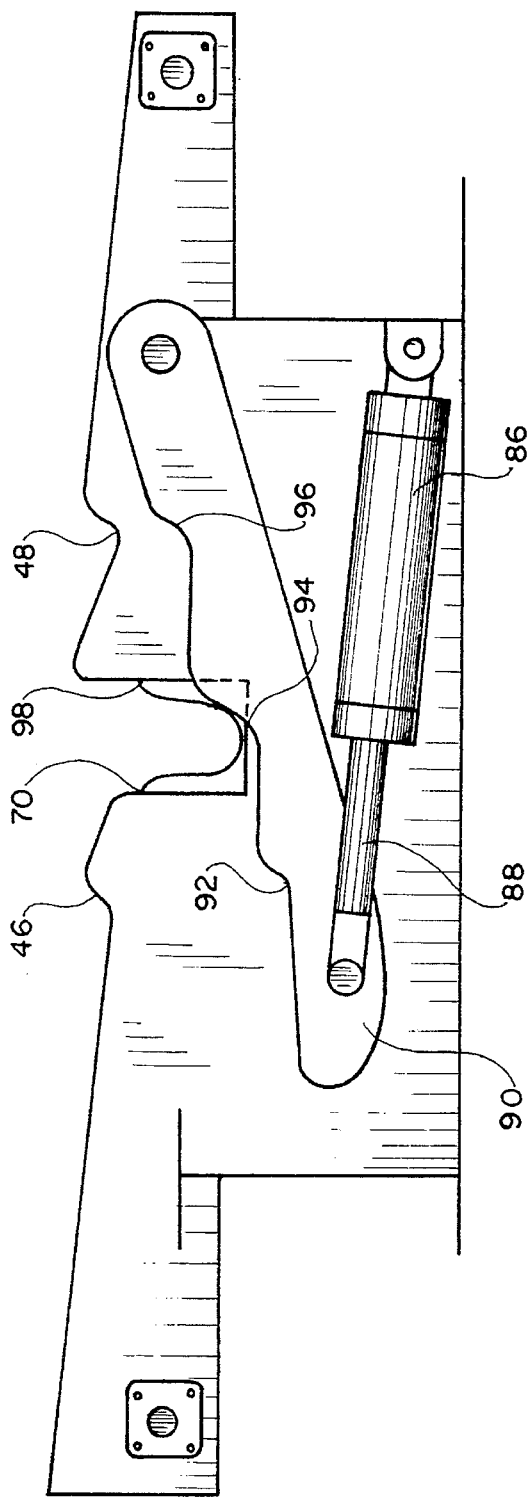
FIG. 3 is a schematic end view of the platform stations and the lift arm.
Figure 5:
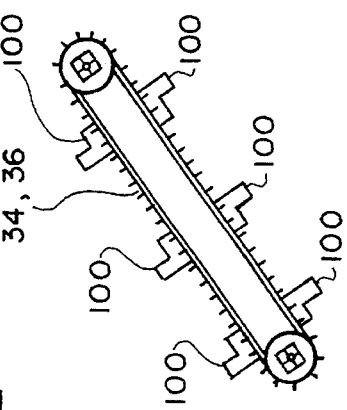
FIG. 5 is a schematic view of the conveyor for delivering the pipes to the platform.

Referring now to the drawings in more detail, numeral 10 designates the pipe testing system in accordance with the present invention. The system comprises a platform 12 which can be transported by a conventional tractor trailer and which is supported by a set of wheels 14 during transportation to a work site. When positioned in place for testing, the platform is further supported by a landing gear 16 which prevents rolling of the platform and allows to slightly incline the platform end 28. The platform carries a pair of test water tanks 18 and 20 mounted underneath the platform. The tanks 18 and 20 are fluidly connected to the test plugs, as will be described hereinafter.

Mounted at the first end 22 of the platform 12 is a control station 22, which houses the control devices, protecting the control equipment from the environment. An operator usually stations himself within the control housing 24 to supervise and control the testing operation. An independent power source 26 and a hydraulic pump are mounted on the opposite end 28 of the platform 12. Secured between the water tanks 18 and 20 is a drive motor 30 for operating load arms and facilitating movement of the pipe segments between different stations on the platform 12. It is envisioned that one or more motors can be provided for conventional operations.

Secured on the inbound side 32 of the platform 12 are a pair of inbound conveyors 34 and 36 which deliver the pipe segments to a pre-testing station 40 which is adapted to retain the pipes in a position schematically shown by numeral 42 in FIG. 2. Mounted on the opposite, outbound side 33 of the platform 12 are a pair of outbound conveyors 44 and 46 which allow to remove pipes from the holding station 48, wherein the pipes are retained in a position schematically illustrated at 50 in FIG. 2 after the testing has been completed.

A set of hydraulic cylinders 52 is mounted at one end of the platform 12 adjacent the conveyors 34 and 44, and a second set of cylinders 54 is mounted on the opposite side of the platform 12 adjacent the conveyors 36 and 46. The hydraulic cylinders 52 and 54 each carry a top plate 56 and 58, respectively, and their telescopically extending arms 60 and 62. The top plates 56 and 58 have test plugs 64 and 66, respectively, attached to their inwardly facing surfaces. Each of the test plugs is fluidly connected to the supply of testing fluid, such as tanks 18 and 20, so as to deliver the testing fluid into a pipe segment positioned within a test cradle 70 (to a position illustrated by numeral 72 in FIG. 2).

A relief valve 68 is fluidly connected to the interior of the test plug 66 to allow escape of air purged from the pipe segment before pressure is applied to the interior of the pipe. The testing fluid is supplied to plugs 64 and 66 through the hydraulic pump, which is part of the motor/pump arrangement 26, and through suitable check valves positioned in the fluid lines (not shown) leading to the test plugs 64 and 66. The inner end of each of the test plugs is sized and shaped to fittingly engage the interior of a pipe end, sealing that end from the exterior while allowing supply of fluid to be delivered into the interior of the pipe before the testing commences.

Figure 4:
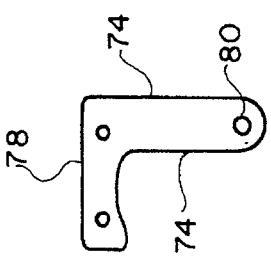
FIG. 4 is a detail view of a locking arm.

Secured to the platform in spaced parallel relationship are a plurality of locking arms 74 which are shown in more detail in FIG. 4. The locking arms are adapted for locking the pipe segments 72 in the testing station 70, in co-alignment with the test plug 64 and 66.

Each of the locking arms 74 has a generally hook-shaped, or inverted t-shaped configuration, having a vertical portion 76 and a transverse shorter horizontal portion 78. Each of the locking arms 74 is adapted for pivotal movement about an axis 80 into a locking engagement with a pipe 72, such that the portion 78 extends above the pipe 72 and prevents its removal from the cradle 70. When not in a locking position, the locking arm 74 is pivoted away from the cradle 70 allowing withdrawal of the pipe from the cradle.

Turning now to FIG. 3, the various stations of the test unit will be described in more detail. As can be seen in the drawing, the unit is provided with a hydraulic lift arm 86 having a telescopically extending portion 88 which engages a second portion 90. The portion 90 is divided into a plurality of steps to allow movement of the pipe from one station to another. The portion 90 of the lift arm has a first curved indentation 92 which allows to move the pipe 42, resting in the pre-testing station 40, into the cradle 70 by rolling the pipe into the second indentation 94. Once the testing has been completed, the lifting arm is activated again, moving the pipe from the cradle 70 into the holding station 48 wherein the pipe is allowed to drain. Activating of the lifting arm forces the pipe to roll into the third indentation 96 of the portion 90 and move the pipe onto the conveyors 44 and 46, and then away from the testing unit 10.

The testing cradle 70 is formed as a rectangular cutout having a flexible resilient insert 98 positioned therein. The insert 98 has a generally U-shaped contact surface for receiving the pipes being tested and preventing metal-to-metal contact between the pipe and the wall of the cradle. It should be noted that in the preferred embodiment all surfaces that come into contact with the pipe segments are provided with resilient strips, such as for example nylon strips, to prevent such a metal-to-metal contact and any damage to the pipes. It is preferred that the conveyors 34, 36, 44 and 46 be aligned with such strips, insulating the pipes from the hard surfaces. Similarly, the upper surface of the portion 90 of the lift arm, the interior of the pre-testing station 40, the curve of the holding station 48, the inner surface of the locking arm 74 each are provided with similar insulating layers of nylon strips for the purposes set forth above.

A pressure intensifier 104 is mounted adjacent the first plug 64 to allow a pressure buildup in the interior of the pipe being tested to facilitate detection of any cracks or leaks in that pipe segment.

In operation, a pipe is picked up by inbound conveyors 34 and 36 and is transported on the chocks 100 to a pre-testing station 40. One or more pipes can be stored within the station 40 at any one time. The lift arm is then operated forcing the pipe to roll from the pre-test station 40 into the cradle 70 and rest within the U-shaped surface of the insert 98. The hydraulic cylinders 52 and 54 are operated to move the test plugs 64 and 66 into engagement with the interior of the pipe by fitting packers 65 and 69 into the pipes in a sealed engagement. The packers 65 and 69 are set at a low pressure (about 375 p.s.i.) to eliminate swelling or belling of pipe ends. It is preferred that the nose pieces of the packers be beveled to allow for easy entry into the interior of the pipes. The plugs engage the interior of the pipes with a single internal cylinder. Each plug is controlled separately. Plug 64 is released, and the hydraulic pump is activated to deliver water through the check valve into the interior of the pipe. At the same time, the air escapes from the pipe through the relief valve. After all of the air is purged, valve 66 is closed, sealing that end of the pipe from the atmosphere.

Once the pipe 72 is filled with water, the pump is shut off, and the intensifier 104 is activated to apply pressure through the internal piston of test plug 64 to the interior of the pipe. The pressure is carefully monitored by the operator on two separate gauges (not shown), with one of the gauges being a recorder. The test plugs initially are set at minimal amount of pressure (650 p.s.i.) to eliminate possible crashing of the pipe. Safety switches are installed on the face of the test plugs for this purpose. Once the test is complete, the valve is opened and the pressure is relieved through the relief valve 68. The test plugs 64 and 66, which have been held in place by the hydraulic rams 52, 54 are withdrawn from the pipe. The lift arm is activated again, rolling the pipe into the holding stage 38. There the pipe is allowed to drain, by gravity, since the end 22 is preferably elevated in relation to the end 28. The water is filtered and recirculated through suction pump(s) back into the holding tanks 18 and 20.

Once again the lift arm is engaged to lift the pipe to roll across the outbound side to rest on the off-load conveyors 44 and 46. The pipe is then lowered to the outbound rack which can be operated by a person outside of the control unit 24.

The platform 12 can be made of a lightweight material, having a pair of H-beams with crossmembers in the center to withstand the pressure of pipe segments having up to 36 feet in length and applying pressure of about 20,000 p.s.i. The system is designed to allow quick and simple set-up at a location and to allow change from one size of pipe being tested to another by a simple substitution of the suitable diameter packers. The locking arms 100 are designed so as to not exert any pressure on the pipes and prevent crushing of the-pipes through contact.

Many changes and modifications can be made within the design of the present invention without departing from the spirit thereof. I, therefore, pray that my rights to the present invention be limited only by the scope of the appended claims.

I claim:

1. A pipe testing system, comprising:

a mobile platform adapted to be transported to a remote location;

a container means for retaining a discrete quantity of a test fluid, said container means being supported by the platform;

a pair of test plugs for engaging interior surfaces of the respective opposite ends of a pipe being tested, said plugs being fluidly connected to the container means;

a means being carried by the platform for moving the pipe, said means comprising a first conveyor means for delivering the pipe to a pre-test station, a lifting arm means for transporting the pipe to a testing cradle and to a holding station, and a second conveyor means for removing the pipe from a holding station;

a means for inserting at least a portion of the test plugs into a fitted engagement within the interior surfaces of the pipe ends;

a means for delivering the test fluid into the pipe;

a means mounted on the platform for applying pressure to the interior of the pipe; and an independent power source.

2. The system of claim 1, further comprising means for retaining the pipe in alignment with the test plugs.

3. The system of claim 2, wherein said holding station comprises retaining means provided with a plurality of spaced-apart locking arms mounted in a pivotal relationship to the platform adjacent said testing cradle.

4. The system of claim 3, wherein each of said locking arms comprises a hook-shaped body having an upper part which extends above said testing cradle when the locking arm is in a pipe retaining position.

5. The system of claim 1, wherein said testing cradle is provided with a U-shaped resilient insert on which the pipe rests during a testing operation.

6. The system of claim 1, wherein said means for inserting at least a portion of the test plugs into the pipe ends comprises a pair of hydraulically operated rams, each mounted adjacent a respective end of the platform, and each carrying an end plate, said test plugs being securely attached to a respective end plate.

7. The system of claim 1, wherein said means for delivering the test fluid comprises a hydraulic pump mounted for fluid communication with said fluid container means and said test plugs.

8. The system of claim 1, wherein said means for applying pressure comprises an intensifier apparatus operationally connected to said test plugs.

9. The system of claim 1, wherein substantially all surfaces of the system which come into contact with the pipe are provided with resilient liner for protecting the pipe against damage.

* * * * *